United States Patent
Matsuo

(10) Patent No.: US 10,804,552 B2
(45) Date of Patent: Oct. 13, 2020

(54) FUEL CELL SYSTEM

(71) Applicant: TOYOTA JIDOSHA KABUSHIKI KAISHA, Toyota-shi, Aichi-ken (JP)

(72) Inventor: Junichi Matsuo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 142 days.

(21) Appl. No.: 16/151,426

(22) Filed: Oct. 4, 2018

(65) Prior Publication Data
US 2019/0165397 A1 May 30, 2019

(30) Foreign Application Priority Data
Nov. 29, 2017 (JP) .................. 2017-229148

(51) Int. Cl.
*H01M 8/04858* (2016.01)
*H01M 8/04* (2016.01)
*B60L 1/00* (2006.01)
*H01M 8/0432* (2016.01)
*H01M 8/0438* (2016.01)
*B60L 50/51* (2019.01)
*B60L 58/12* (2019.01)
*B60L 58/40* (2019.01)

(52) U.S. Cl.
CPC ......... *H01M 8/04858* (2013.01); *B60L 1/003* (2013.01); *B60L 50/51* (2019.02); *B60L 58/12* (2019.02); *B60L 58/40* (2019.02); *H01M 8/0438* (2013.01); *H01M 8/04358* (2013.01); *B60L 2240/12* (2013.01); *B60L 2240/36* (2013.01); *B60L 2240/545* (2013.01); *B60L 2240/547* (2013.01); *H01M 2250/20* (2013.01)

(58) Field of Classification Search
None
See application file for complete search history.

(56) References Cited

U.S. PATENT DOCUMENTS

| | | |
|---|---|---|
| 2014/0087285 A1 | 3/2014 | Kumada et al. |
| 2017/0028981 A1 | 2/2017 | Ogawa et al. |

FOREIGN PATENT DOCUMENTS

| | | |
|---|---|---|
| JP | 2012-244721 | 12/2012 |
| JP | 2017-030468 | 2/2017 |
| JP | 2017-135860 | 8/2017 |

*Primary Examiner* — Yoshitoshi Takeuchi
(74) *Attorney, Agent, or Firm* — Finnegan, Henderson, Farabow, Garrett & Dunner, LLP

(57) ABSTRACT

A control unit comprised in a fuel cell system is configured to perform prediction of whether a required output for a motor generator has a positive value and determination of whether a voltage of a fuel cell is less than a target voltage during execution of an auxiliary machine power consumption, and is configured to set a bypass valve to a first degree of opening during execution of the auxiliary machine power consumption when a result of at least one of the prediction and the determination is negative, and is configured to set the bypass valve to a second degree of opening less than the first degree of opening during execution of the auxiliary machine power consumption when results of both the prediction and the determination are positive.

9 Claims, 7 Drawing Sheets

FUEL CELL SYSTEM

INCORPORATION BY REFERENCE

The disclosure of Japanese Patent Application No. 2017-229148 filed on Nov. 29, 2017 including the specification, drawings and abstract is incorporated herein by reference in its entirety.

BACKGROUND

1. Technical Field

The disclosure relates to auxiliary machine power consumption for consuming extra regenerative power.

2. Description of Related Art

In general, a fuel cell system which is mounted in a vehicle is configured to charge a secondary battery with regenerative power from a traveling motor generator. Here, when all the regenerative power is assigned to charging of the secondary battery, there may be a problem in the secondary battery depending on the state of the secondary battery. Japanese Unexamined Patent Application Publication No. 2017-135860 (JP 2017-135860 A) discloses that extra regenerative power is mainly consumed in an air compressor in this case.

SUMMARY

JP 2017-135860 A does not disclose control or phenomena near ending of auxiliary machine power consumption. JP 2017-135860 A does not also disclose a flow of compressed air during execution of auxiliary machine power consumption.

When auxiliary machine power consumption is carried out in an air compressor, compressed air is generated. When all the compressed air is supplied to a fuel cell that is not performing power generation, drying of the fuel cell progresses and a voltage thereof increases excessively, whereby cells may be damaged. Accordingly, it is preferable that at least some compressed air do not flow into the fuel cell but be discharged to the air.

On the other hand, at a time point at which a required output for a motor generator becomes a positive value, regenerative power is not generated and thus it is necessary to stop auxiliary machine power consumption and to supply electric power to the motor generator.

However, when compressed air does not flow into the fuel cell during execution of auxiliary machine power consumption, the voltage of the fuel cell may be excessively low at the time point at which the required output for the motor generator becomes a positive value. When the voltage of the fuel cell is excessively low, a generated power has a small value. In order to increase the voltage of the fuel cell, it is necessary to supply electric power to the air compressor. However, since the generated power is small, necessary electric power cannot be supplied to the air compressor. Accordingly, the voltage of the fuel cell increases slowly and the required power for the motor generator cannot be supplied.

When the generated power is less than the required power, electric power from the secondary battery may be used. However, in order to maintain the SOC of the secondary battery, it is preferable that supply of electric power from the secondary battery be avoided as much as possible.

In consideration of the above-mentioned circumstances, the disclosure provides a fuel cell system that can protect a fuel cell and a secondary battery while causing a generated power to approach a required power after auxiliary machine power consumption has ended.

According to an aspect of the disclosure, there is provided a fuel cell system including: a fuel cell: a secondary battery: a motor generator configured to charge the secondary battery with a regenerative power, the motor generator being driven with electric power from at least one of the fuel cell and the secondary battery; an air compressor configured to generate compressed air, the air compressor being driven with electric power from at least one of the fuel cell and the regenerative power; a supply passage configured to supply the compressed air to the fuel cell; a discharge passage configured to discharge the compressed air from the fuel cell; a bypass passage configured to connect the supply passage and the discharge passage; a bypass valve disposed in the bypass passage; and a control unit configured to perform auxiliary machine power consumption of supplying at least a part of the regenerative power to the air compressor upon satisfaction of a necessary condition that charging of the secondary battery is limited when the fuel cell does not generate electric power and the regenerative power is generated, wherein the control unit is configured to perform prediction of whether a required output for the motor generator has a positive value and determination of whether a voltage of the fuel cell is less than a target voltage during execution of the auxiliary machine power consumption, the control unit is configured to set the bypass valve to a first degree of opening during execution of the auxiliary machine power consumption when a result of at least one of the prediction and the determination is negative, and the control unit is configured to set the bypass valve to a second degree of opening less than the first degree of opening during execution of the auxiliary machine power consumption when results of both the prediction and the determination are positive.

According to this configuration, in comparison with a case in which a bypass valve is fixed to the first degree of opening during execution of the auxiliary machine power consumption, a flow rate of compressed air supplied to the fuel cell increases when the bypass valve is set to the second degree of opening, and thus there is a high likelihood that the voltage of the fuel cell will be a value close to the target voltage at a time point at which the required output for the motor generator becomes a positive value. Accordingly, after the time point at which the required output for the motor generator becomes a positive value, there is a high likelihood that an output close to the required output will be exhibited. When an output close to the required output is exhibited by the fuel cell, most of electric power supplied to the motor generator and the air compressor can be replenished by generation of power in the fuel cell. When the result of at least one of the prediction and the determination is negative, the bypass valve is set to the first degree of opening and thus it is possible to curb a progress of drying of the fuel cell or an increase in potential of the fuel cell in comparison with a case in which the bypass valve is fixed to the second degree of opening.

In the aspect, the control unit may be configured to use an amount of operation which is input to a user interface for manipulating the required output for the motor generator for the prediction. According to this configuration, when the fuel cell system is mounted in a transportation machine, it is possible to appropriately perform the prediction.

In the aspect, the target voltage may have a fixed value. According to this configuration, a computation load for determination decreases.

In the aspect, the control unit may be configured to determine a predicted value of the required output when it is predicted that the required output has a positive value, the control unit may be configured to set the target voltage to a first voltage value when the predicted value is a first positive value, and the control unit may be configured to set the target voltage to a second voltage value higher than the first voltage value when the predicted value is a second positive value greater than the first positive value. According to this configuration, it is possible to more appropriately select the degree of opening of the bypass valve by appropriately setting the target voltage.

In the aspect, the fuel cell system may be mounted in a transportation machine, and the control unit may be configured to use route information for the prediction. According to this configuration, when the fuel cell system is mounted in a transportation machine, it is possible to appropriately perform the prediction.

In the aspect, the first degree of opening may be a maximum degree of opening. According to this configuration, since a passage resistance of the bypass passage decreases, it is possible to reduce a flow rate of compressed air flowing in the fuel cell even when the compressed air can flow into the fuel cell.

In the aspect, the second degree of opening may be a degree of opening in a valve closed state. According to this configuration, it is possible to efficiently increase a flow rate of compressed air flowing in the fuel cell.

In the aspect, the fuel cell system may further include: an inlet valve that is disposed in the supply passage and is located between a junction of the supply passage with the bypass passage and the fuel cell; and an outlet valve that is disposed in the discharge passage and is located between a junction of the discharge passage with the bypass passage and the fuel cell, and the control unit may be configured to set at least one of the inlet valve and the outlet valve to a valve closed state when the bypass valve is set to the first degree of opening during execution of the auxiliary machine power consumption. According to this configuration, when the result of at least one of the prediction and the determination is negative, it is possible to set a flow rate of compressed air flowing in the fuel cell to almost zero. In addition, it is possible to further curb a progress of drying of the fuel cell or an increase in potential of the fuel cell.

In the aspect, the fuel cell system may further include an outlet valve that is disposed in the discharge passage and is located between a junction of the discharge passage with the bypass passage and the fuel cell, the control unit may be configured to set the outlet valve to a valve closed state when the bypass valve is set to the first degree of opening during execution of the auxiliary machine power consumption, and the control unit may be configured to set the outlet valve to a valve open state when the bypass valve is set to the second degree of opening during execution of the auxiliary machine power consumption. According to this configuration, it is possible to easily realize permission or prohibition of compressed air flowing into the fuel cell.

The disclosure can be embodied in various forms other than described above. For example, the disclosure can be embodied in the form of a transportation machine having the fuel cell system mounted therein, a valve setting method, a program for realizing the method, a non-transitory storage medium having the program stored therein, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
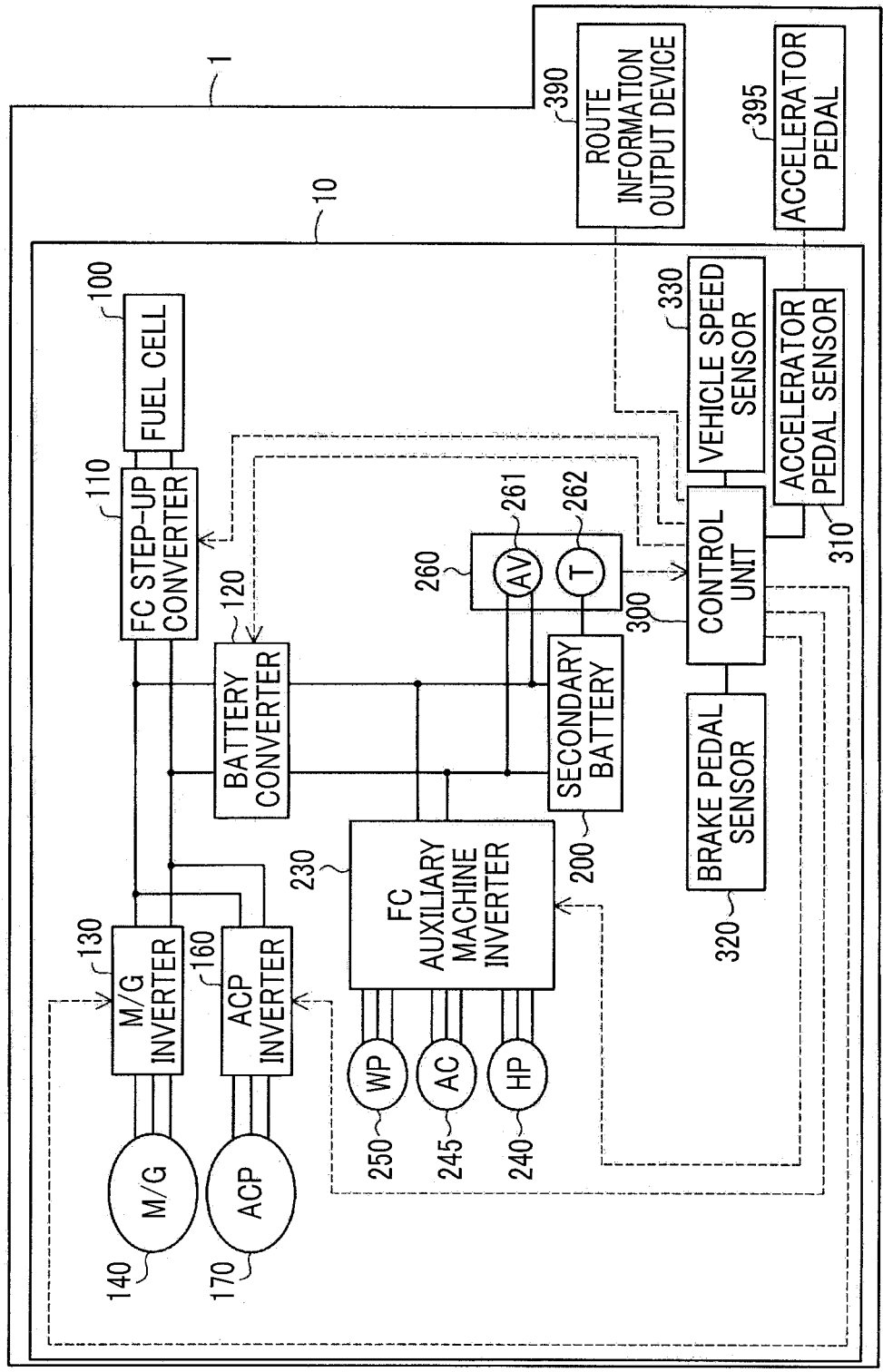
FIG. 1 is a diagram schematically illustrating a configuration of an electrical system of a fuel cell system.

A first embodiment of the disclosure will be described. FIG. 1 is a diagram schematically illustrating a configuration of an electrical system of a fuel cell system 10. The fuel cell system 10 is mounted in a vehicle 1 including a route information output device 390 and an accelerator pedal 395. The route information output device 390 is not used in this embodiment and thus will be described later.

The fuel cell system 10 includes a fuel cell 100, an FC step-up converter 110, a battery converter 120, an M/G inverter 130, an M/G 140, an ACP inverter 160, an air compressor 170, a secondary battery 200, an FC auxiliary-machine inverter 230, a hydrogen pump 240, an air-conditioning compressor 245, a coolant pump 250, a detection unit 260, a control unit 300, an accelerator pedal sensor 310, a brake pedal sensor 320, and a vehicle speed sensor 330.

In this embodiment, the air compressor 170, the hydrogen pump 240, and the coolant pump 250 are collectively referred to as auxiliary machine. The air-conditioning compressor 245 is connected to the FC auxiliary-machine inverter 230 but is not included in the auxiliary machine in this embodiment.

The fuel cell 100 is a solid polymer type fuel cell that generates electric power in response to supply of a fuel gas and an oxidant gas.

The FC step-up converter 110 is a DC/DC converter that steps up an output voltage of the fuel cell 100 to a high voltage which can be used in the M/G 140. The M/G inverter 130 converts a DC voltage into an AC voltage and supplies the AC voltage to the M/G 140. The M/G 140 has a function of a motor that drives wheels of the vehicle and a function of a generator that generates regenerative power.

The ACP inverter 160 converts a stepped-up DC voltage into an AC voltage and supplies the AC voltage to the air compressor 170. The battery converter 120 is a bidirectional DC/DC converter. That is, the battery converter 120 steps down the voltage of the fuel cell 100 and supplies the stepped-down voltage to the secondary battery 200 or the FC auxiliary-machine inverter 230, or steps up the voltage of the secondary battery 200 and supplies the stepped-up voltage to the M/G inverter 130 and the ACP inverter 160.

The secondary battery 200 serves as a power supply of the M/G 140, the hydrogen pump 240, the coolant pump 250, and the like. The secondary battery 200 is charged with electric power from the fuel cell 100 or regenerative power from the M/G 140. The secondary battery 200 in this embodiment is a lithium-ion secondary battery.

The FC auxiliary-machine inverter 230 converts a DC voltage into an AC voltage and supplies the AC voltage to the hydrogen pump 240, the air-conditioning compressor 245, and the coolant pump 250.

The detection unit 260 includes a battery sensor 261 and a temperature sensor 262. The battery sensor 261 acquires a current, a voltage, and an SOC of the secondary battery 200. The temperature sensor 262 acquires a battery temperature of the secondary battery 200. The SOC represents a ratio of an amount of residual power to an amount of power fully charged in the secondary battery 200, in which an upper limit value of an actual usage range thereof is set to 100% and a lower limit value thereof is set to 0%.

The detection unit 260 can detect a battery load of the secondary battery 200 using the acquired values of the current, the SOC, and the battery temperature and an input current value. The input current value is a current value which is input to the secondary battery 200 when the secondary battery 200 is charged. As the value of any one of the SOC, the temperature, and the input current increases, the battery load increases.

The detection unit 260 can determine a threshold value of a charging power of the secondary battery 200 using the acquired values of the SOC and the battery temperature.

The control unit 300 is constituted by an electronic control unit (ECU) including a central processing unit (CPU) and a main storage device. The accelerator pedal sensor 310 that detects an amount of depression of an accelerator pedal 395, the brake pedal sensor 320 that detects an amount of depression of a brake pedal (not illustrated), and the vehicle speed sensor 330 that detects a vehicle speed are connected to the control unit 300. The accelerator pedal 395 is a user interface that operates a required output for the M/G 140. The amount of depression of the accelerator pedal 395 is also referred to as an amount of operation of the accelerator pedal 395.

The control unit 300 controls operations of the units in the fuel cell system 10 based on detection signals from various sensors. In FIG. 1, signal paths from the control unit 300 to some circuits are drawn as dotted lines.

The control unit 300 performs a charging process of charging the secondary battery 200 with regenerative power generated by the M/G 140. The control unit 300 determines a required value for the regenerative power (hereinafter referred to as a required regenerative power) based on a required braking force. The required braking force is calculated based on the vehicle speed, the amount of depression of the accelerator pedal 395, and the amount of depression of the brake pedal. A required output having a negative value is referred to as a required regenerative power, and the required regenerative power may be rewritten as a required output.

When charging of the secondary battery 200 is limited, the control unit 300 uses the regenerative power as effectively as possible. Specifically, when the air-conditioning compressor 245 requires electric power, the regenerative power is supplied to the air-conditioning compressor 245.

On the other hand, when the air-conditioning compressor 245 is not supplied with electric power, the control unit 300 supplies the regenerative power to the auxiliary machine. When the air-conditioning compressor 245 is supplied with electric power but the regenerative power is in excess, the control unit 300 supplies the auxiliary machine with the excess power.

The electric power supplied to the auxiliary machine is not effectively used but is finally discarded to the air. This discarding of the regenerative power in this way is referred to as auxiliary machine power consumption. The expression "discarding of electric power" includes the meaning that the auxiliary machine is supplied with electric power but an amount of power generated by the fuel cell 100 is zero in addition to a meaning that charging of the secondary battery 200 is not carried out. When the regenerative power is in excess, the required output for the fuel cell 100 is generally zero and thus the generated power is also zero.

Figure 2:
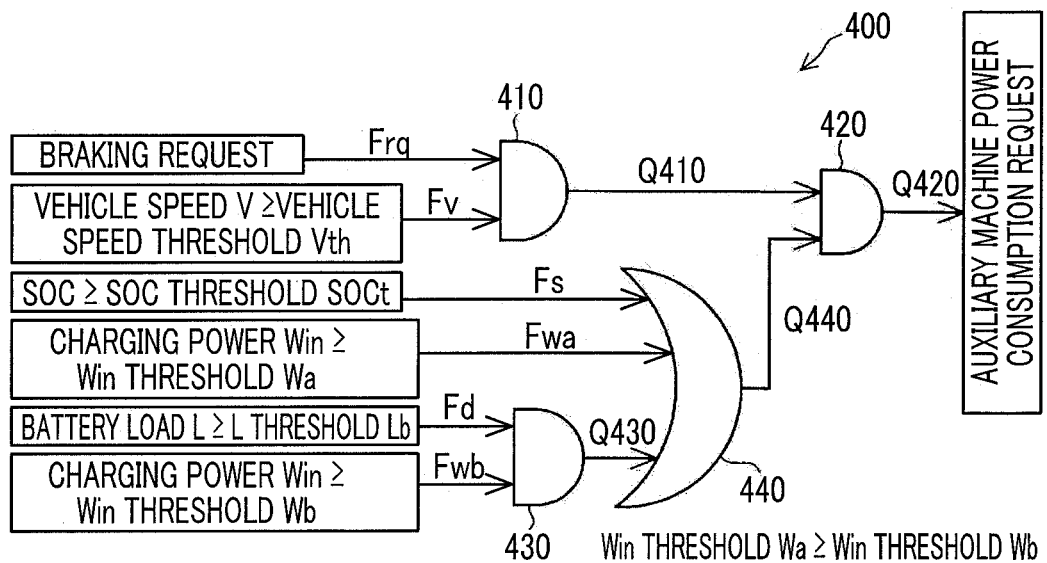
FIG. 2 is a block diagram illustrating an equivalent logical circuit that determines whether auxiliary machine power consumption is carried out.

FIG. 2 is a block diagram illustrating an equivalent logical circuit 400 that determines whether there is an auxiliary machine power consumption request at the time of regeneration. The equivalent logical circuit 400 includes two-input AND elements 410, 420, and 430 and a three-input OR element 440. Flags used herein are as follows.

(1) A braking request flag Frq is a flag which is set to 1 when it is determined that braking is necessary and which is set to 0 when braking is not necessary, based on the amount of depression of the accelerator pedal 395 and the amount of depression of the brake pedal or based on rates of change of the amounts of depression.

(2) A vehicle speed determination flag Fv is a flag which is set to 1 when the vehicle speed V is equal to or higher than a predetermined vehicle speed threshold value Vth and which is set to 0 when the vehicle speed V is lower than the vehicle speed threshold value Vth.

(3) An SOC determination flag Fs is a flag which is set to 1 when the SOC of the secondary battery 200 is equal to or greater than a predetermined SOC threshold value SOCt and which is set to 0 when the OSC is less than the SOC threshold value SOCt. When the SOC of the secondary battery 200 is equal to or greater than the threshold value SOCt, the secondary battery 200 is close to a fully charged state. The SOC threshold value SOCt is a threshold value for avoiding charging when the SOC of the secondary battery 200 is equal to or greater than the threshold value SOCt.

(4) A charging power determination flag Fwa is a flag which is set to 1 when a charging power Win of the secondary battery 200 is equal to or greater than a predetermined first Win threshold value Wa and which is set to 0 when the charging power Win is less than the first Win threshold value Wa. When the charging power Win is equal to or greater than the threshold value Wa, an amount of regenerative power for satisfying a required braking force is large. The first Win threshold value Wa is a threshold value for increasing the regenerative power when the charging power Win is equal to or greater than the threshold value Wa.

(5) A battery load determination flag Fd is a flag which is set to 1 when a battery load L of the secondary battery 200 is equal to or greater than a predetermined load threshold value Lb and which is set to 0 when the battery load L is less than the load threshold value Lb. The load threshold value Lb may be set such that a time at which the battery load determination flag Fd rises from 0 to 1 is earlier than a time at which the charging power determination flag Fwa rises from 0 to 1.

(6) A charging power determination flag Fwb is a flag which is set to 1 when the charging power Win of the secondary battery 200 is equal to or greater than a predetermined second Win threshold value Wb and which is set to 0 when the charging power Win is less than the second Win threshold value Wb. When the charging power Win is less than the threshold value Wb, the amount of regenerative power for satisfying the required braking force is small. The second Win threshold value Wb is a threshold value for decreasing the regenerative power when the charging power Win is less than the threshold value Wb. The second Win threshold value Wb is less than the first Win threshold value Wa. The two Win threshold values Wa and Wb may be set depending on the SOC and the battery temperature of the secondary battery 200. In this case, the Win threshold values Wa and Wb may be set to decrease as the SOC increases and the Win threshold values Wa and Wb may be set to decrease as the battery temperature increases.

The braking request flag Frq and the vehicle speed determination flag Fv are input to the two-input AND element 410. The battery load determination flag Fd and the charging power determination flag Fwb are input to the two-input AND element 430. The SOC determination flag Fs, the charging power determination flag Fwa, and an output Q430 of the two-input AND element 430 are input to the three-input OR element 440. An output Q410 of the two-input AND element 410 and an output Q440 of the three-input OR element 440 are input to the two-input AND element 420. An output Q420 of the two-input AND element 420 is a value indicating whether there is an auxiliary machine power consumption request.

In this embodiment, for example, when four conditions that the braking request flag Frq is 1, the vehicle speed determination flag Fv is 1, the battery load determination flag Fd is 1, and the charging power determination flag Fwb is 1 are simultaneously satisfied, the output Q410 (=1) of the two-input AND element 410 and the output Q440 of the three-input OR element 440 (=1) having the output Q430 (=1) of the two-input AND element 430 input thereto are input to the two-input AND element 420. Accordingly, the output Q420 of the two-input AND element 420 is a value (=1) indicating an auxiliary machine power consumption request.

As described above, a necessary condition for causing the value indicating an auxiliary machine power consumption request to be 1 is that the output Q440 is 1. When the output Q440 is 1, it refers to a state in which charging of the secondary battery 200 is limited.

Figure 3:
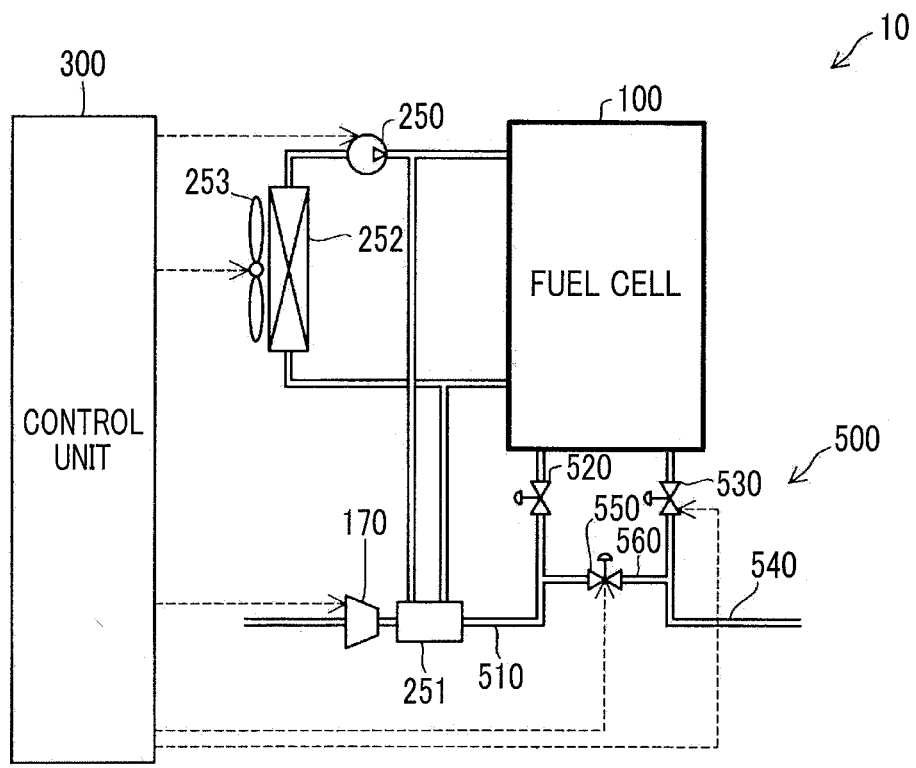
FIG. 3 is a diagram illustrating auxiliary machine power consumption.

FIG. 3 is a diagram illustrating a configuration for auxiliary machine power consumption. The fuel cell system 10 additionally includes a piping system 500, an after cooler 251, a radiator 252, and a fan 253. The after cooler is also referred to as an intercooler. The piping system 500 includes a supply passage 510, an inlet shunt valve 520, a pressure control valve 530, a discharge passage 540, a bypass passage 550, and a bypass valve 560.

When auxiliary machine power consumption is performed, the control unit 300 supplies most the regenerative power to the air compressor 170. This is because the air compressor 170 has greater power consumption than the hydrogen pump 240 and the coolant pump 250 which are other auxiliary machines and can be easily used as a supply destination of the regenerative power. When the air compressor 170 is supplied with electric power, compressed air (hereinafter simply referred to as air) is generated. When auxiliary machine power consumption is performed, a part of the regenerative power is supplied to the coolant pump 250 in order to cool the air.

Most of the power supplied to the air compressor 170 is converted into internal energy and kinetic energy of air. A part of the internal energy is discarded to the atmospheric air via the after cooler 251 and the radiator 252. The other energy is discarded to the atmospheric air via the discharge passage 540 along with the air.

When auxiliary machine power consumption is performed, the control unit 300 closes the pressure control valve 530 and opens the bypass valve 560 such that the degree of opening is maximized. This degree of opening is defined as a first degree of opening. In the following description, this ON-OFF state of the valves is referred to as a "first state of the piping system 500" or simply referred to as a "first state." In the first state, air supplied from the air compressor 170 is not supplied to the fuel cell 100 and is discharged to the atmospheric air via the bypass passage 550. The inlet shunt valve 520 is opened in the first state in this embodiment. The inlet shunt valve 520 may be closed in the first state in another example.

On the other hand, when air is supplied to the fuel cell 100, the control unit 300 opens the inlet shunt valve 520 and the pressure control valve 530 and closes the bypass valve 560. The degree of opening for realizing this valve closed state is defined as a second degree of opening. The second degree of opening is less than the first degree of opening. In the following description, this ON-OFF state of the valves is defined as a second state. In general, setting of the second state is performed for generation of power by the fuel cell 100.

In any of the first state and the second state, air is cooled by the after cooler 251. The after cooler 251 exhibits a cooling function using a coolant which is circulated by the coolant pump 250. The coolant is cooled by passing through the radiator 252. The fan 253 promotes cooling of the coolant by supplying wind to the radiator 252.

The control unit 300 transmits a drive signal to the coolant pump 250 and the fan 253 in order to realize cooling of the air. The fan 253 is supplied with electric power from a low-voltage power supply (specifically, a lead storage battery) which is not illustrated. The coolant also circulates in the fuel cell 100 to cool the fuel cell 100.

Figure 4:
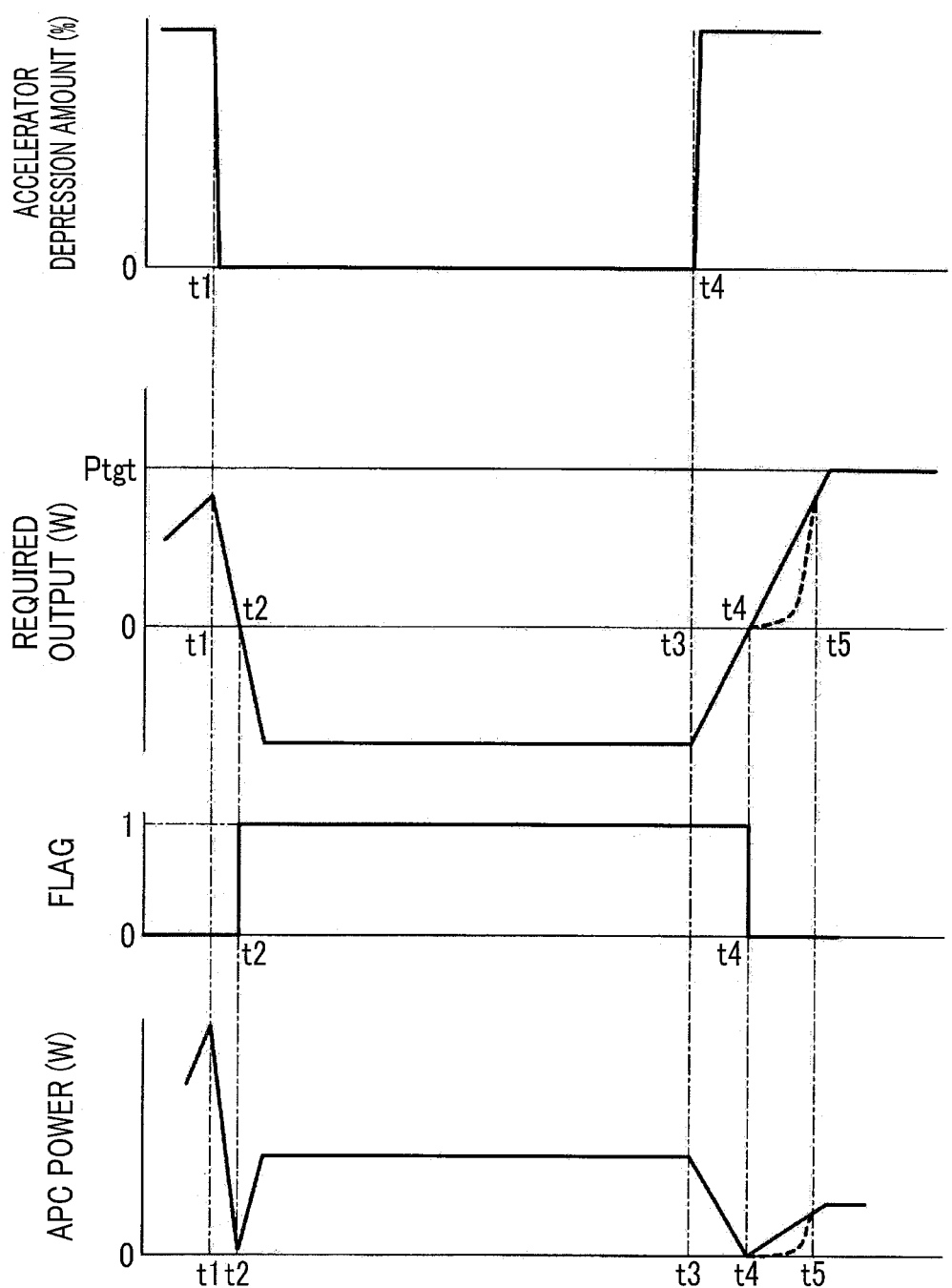
FIG. 4 is a graph schematically illustrating change during execution of auxiliary machine power consumption and before and after execution of auxiliary machine power consumption.
Figure 5:
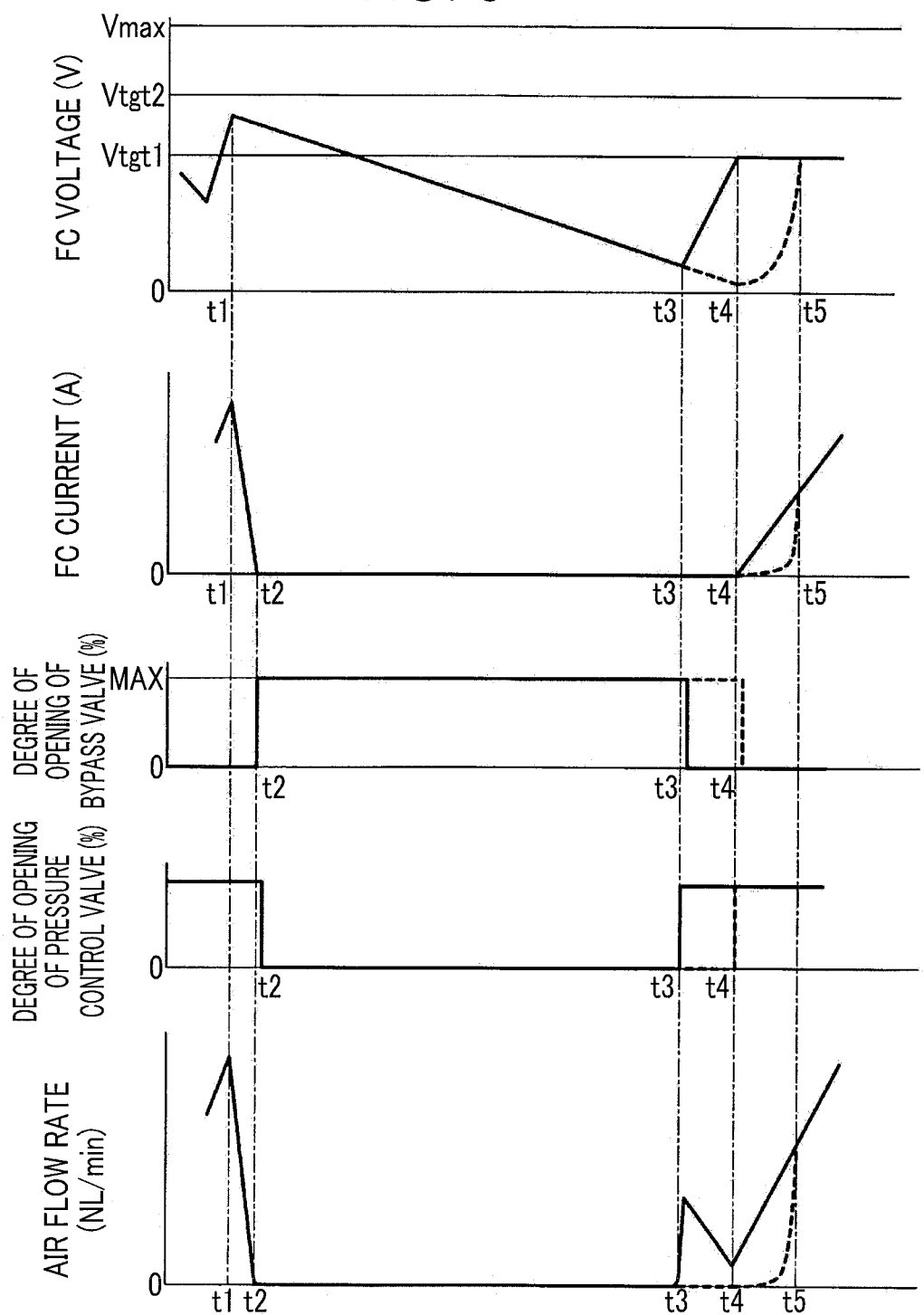
FIG. 5 is a graph schematically illustrating change during execution of auxiliary machine power consumption and before and after execution of auxiliary machine power consumption.

FIGS. 4 and 5 are graphs schematically illustrating a state in which various parameters change during execution of auxiliary machine power consumption and before and after execution of auxiliary machine power consumption. In FIGS. 4 and 5, a comparative example is indicated by a dotted line.

A target voltage Vtgt2 illustrated in FIG. 5 is not used in the first embodiment, but is used in a second embodiment. As described above, the regenerative power is also supplied to the coolant pump 250 during execution of auxiliary machine power consumption, but the power consumption of the coolant pump 250 is small and thus supply of power to the coolant pump 250 will be ignored in the following description.

A required output (W) represented by the vertical axis in the graph denotes a required output for the M/G 140 when it has a positive value, and denotes a required regenerative power when it has a negative value. In this embodiment, it is assumed that the output and the required regenerative power of the M/G 140 are realized without error. A dotted line indicating a comparative example for the required output denotes an actual output, not the required output. In the comparative example, the required output is the same value as in this embodiment.

The flag represented by the vertical axis in the graph denotes a value of the output Q420 indicating an auxiliary machine power consumption request. The ACP power (W) denotes electric power supplied to the air compressor 170. The FC voltage is a voltage generated by the fuel cell 100. The FC current is a current generated by the fuel cell 100. The FC air flow rate (NL/min) is a flow rate of air flowing in the fuel cell 100.

A high-potential avoidance voltage Vmax represented by the graph of the FC voltage denotes an upper limit value which is set to avoid damage of the fuel cell 100.

In the graph illustrated in the drawing, the accelerator pedal 395 is depressed before time t1. Accordingly, generation of power in the fuel cell 100 is performed and the generated power is supplied to the M/G 140 and the air compressor 170. Before time t1, the valve ON-OFF state is set to the second state in order to perform generation of power. Accordingly, air flows in the fuel cell 100. When the degrees of opening of the bypass valve 560 and the pressure control valve 530 are zero, it refers to the valve closed state.

At time t1, the amount of depression of the accelerator pedal 395 decreases rapidly and the amount of depression becomes zero finally. Accordingly, the required output starts decreasing at time t1. With this, all the ACP power, the FC voltage, and the FC current start decreasing.

The graph illustrated in the drawing exemplifies a case in which it is assumed that the vehicle starts traveling down a slope at time t1 and then travels down the slope at a constant speed finally. Accordingly, at a time after time t1, the required output becomes a negative value and becomes constant finally. A time at which the required output becomes zero is time t2.

In the graph illustrated in the drawing, the flag is set to 1 when the required output has a negative value and is set to 0 when the required output has a positive value. Accordingly, auxiliary machine power consumption is started at time t2.

When the auxiliary machine power consumption is started, the regenerative power is supplied to the air compressor 170. The piping system 500 is set to the first state. The pressure control valve 530 is closed slightly later than the time at which the flag is set to 1. This is because, when both the bypass valve 560 and the pressure control valve 530 have a period for closing the valves, a destination of air disappears in the period and thus a time difference is provided for safety. In the first state, the FC air flow rate is zero.

The FC current decreases with a decrease in power supplied to the M/G 140 and the air compressor 170, and is controlled such that it becomes zero at time t2 at which the supplied power becomes zero. The FC voltage decreases slowly with a decrease in the FC air flow rate after time t1.

Figure 6:
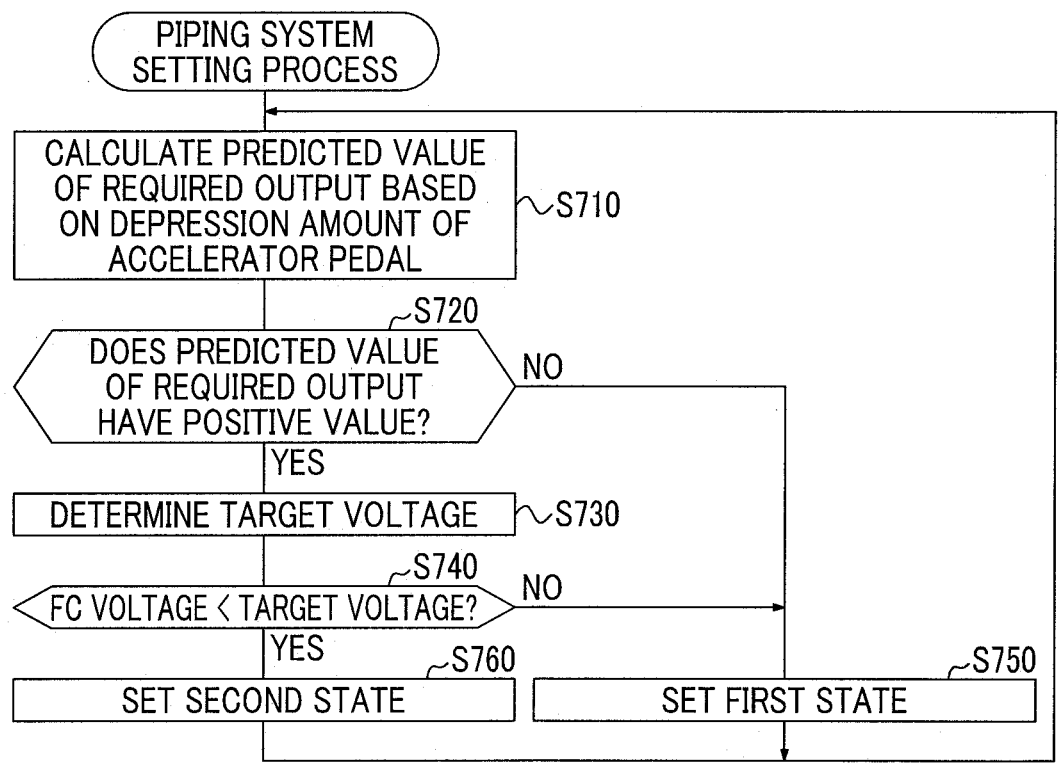
FIG. 6 is a flowchart illustrating a piping system setting process.

FIG. 6 is a flowchart illustrating a piping system setting process. The control unit 300 stores a program for performing the piping system setting process. When auxiliary machine power consumption is requested, the control unit 300 first sets the first state and then starts the piping system setting process. When the requesting for auxiliary machine power consumption ends, the control unit 300 ends the piping system setting process.

First, the control unit 300 calculates a predicted value of a required output (S710). In S710, when a required output equal to or less than zero is predicted, it is merely that the required output is equal to or less than zero and a specific numerical value thereof is not predicted. On the other hand, when a required output of a positive value is predicted, a specific numerical value is predicted.

In this embodiment, the predicted value is calculated based on an amount of depression of the accelerator pedal 395 (hereinafter, an amount of depression refers to an amount of depression of the accelerator pedal 395). When the amount of depression is zero, the required output is predicted to be equal to or less than zero. When the amount of depression is greater than zero, the required output is predicted to be a positive value or predicted to be equal to or less than zero from a relationship with a vehicle speed or the like.

Then, the control unit 300 determines whether the predicted value of the required output is positive (S720). When the predicted value of the required output is equal to or less than zero (NO in S720), the control unit 300 sets the first state (S750). That is, the auxiliary machine power consumption is continuously performed normally. Thereafter, the process returns to S710.

In the graph illustrated in the drawing, the amount of depression is zero up to time t3. Accordingly, from time t2 at which the auxiliary machine power consumption is started to time t3, the determination result of S720 is NO and the first state is maintained.

In the graph illustrated in the drawing, the accelerator pedal is depressed at time t3. As a result, the control unit 300 calculates a required output of a positive value as the predicted value at time t3 (S710). In FIG. 4, the required output Ptgt is illustrated as the calculated required output. Changing of the required output is delayed with respect to changing of the amount of depression. This is to avoid rapid acceleration. The reason why determination of the required output Ptgt is expressed as prediction as described above is that the required output Ptgt at the time point at which the amount of depression has been determined is a required output in the future.

When a required output of a positive value is calculated as the predicted value in S710, the control unit 300 determines that the determination result of S720 is YES, and then performs S730. In S730, the control unit 300 determines a target voltage Vtgt1.

Figure 7:
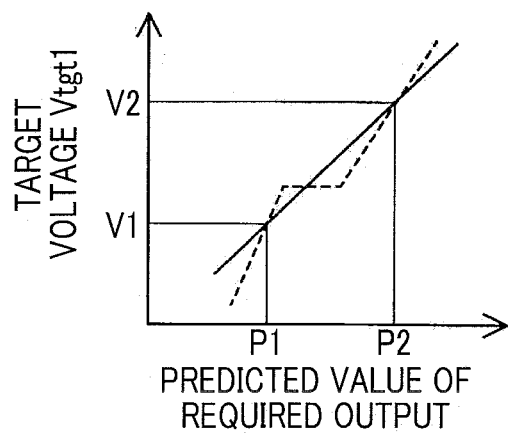
FIG. 7 is a graph illustrating a relationship between a target voltage and a predicted value of a required output.

FIG. 7 is a graph schematically illustrating a relationship between the target voltage Vtgt1 and the predicted value of the required output Ptgt. A solid line represents this embodiment and a dotted line represents another example. The target voltage Vtgt1 in this embodiment is determined to increase monotonously with an increase in the predicted value of the required output Ptgt.

For example, as illustrated in FIG. 7, when the required output has a first positive value P1, the target voltage is set to a first voltage value V1. When the required output has a second positive value P2 which is greater than the first positive value P1, the target voltage is set to a second voltage value V2 which is higher than the first voltage value V1.

In the other example illustrated in the drawing, the relationship between the predicted value of the required output and the target voltage when two points are taken in this way is the same as in this embodiment. However, in the other example, a section in which the target voltage Vtgt1 does not change in spite of an increase in the predicted value of the required output is present. That is, the relationship between the target voltage Vtgt1 and the predicted value of the required output Ptgt in the other example is a monotonous increase in a wide sense.

Then, the control unit 300 determines whether the FC voltage is lower than the target voltage Vtgt1 (S740). When the FC voltage is equal to or higher than the target voltage Vtgt1 (NO in S740), the control unit sets the first state in S750.

On the other hand, when the FC voltage is lower than the target voltage Vtgt1 (YES in S740), the control unit sets the second state in S760.

In the graph illustrated in the drawing, since the FC voltage is lower than the target voltage Vtgt1 at a time point of time t3, S760 is performed at time t3. Accordingly, air starts rapidly flowing in the fuel cell 100 at time t3. As a result, an increase of the FC voltage is started. Here, the FC air flow rate takes a peak immediately after time t3 and then decreases slowly with a decrease in the ACP power. The reason why the ACP power decreases is that the required output becomes zero and thus the regenerative power decreases.

At time t4, the required output becomes zero. As a result, the flag becomes zero and the auxiliary machine power consumption ends. When the auxiliary machine power consumption ends, the control unit 300 ends the piping system setting process.

In the graph illustrated in the drawing, at time t4, the FC voltage reaches the target voltage Vtgt1. Even if the power supplied to the air compressor 170 instantaneously becomes zero at time t4, the FC air flow rate does not become zero immediately due to inertia. Accordingly, the FC current can be increased from time t4.

As a result, the fuel cell 100 can generate electric power for realizing the required output. The electric power for realizing the required output is electric power equal to or greater than at least a sum of electric power supplied to the M/G 140 and electric power supplied to the air compressor 170. Accordingly, in this embodiment, it is possible to realize the required output without using supply of power from the secondary battery 200 after the auxiliary machine power consumption ends.

A comparative example will be described below. The comparative example is the same as this embodiment, in that supply of power from the secondary battery is not performed. On the other hand, the comparative example is different from this embodiment, in that the piping system setting process is not performed. Accordingly, the first state is maintained during execution of auxiliary machine power consumption. In the graph illustrated in the drawing, the first state is maintained from time t2 to time t4, and the second state is set after time t4.

Accordingly, in the comparative example, the FC voltage decreases continuously after time t3. At time t4, the FC voltage is excessively low and thus the FC current cannot be increased. As a result, the electric power generated by the fuel cell 100 is less than the electric power for realizing the required output. That is, since an increase in the FC voltage is necessary for increasing the generated power, a slight generated power is supplied to the air compressor 170. Accordingly, the electric power supplied to the M/G 140 is much less than the required power.

Since electric power supplied to the air compressor 170 immediately after time t4 is small, the FC air flow rate increases only slowly and the FC voltage also increases only slowly. As a result, the generated power is less than the required power from time t4 to time t5.

According to this embodiment which has been described above, it is possible to realize the required output immediately after auxiliary machine power consumption has ended without performing supply of power from the secondary battery 200. Accordingly, it is possible to maintain the SOC of the secondary battery 200 and to curb deterioration of the secondary battery 200 which is caused by changing of the SOC.

As described above, there are two reasons why the required output can be realized immediately after the auxiliary machine power consumption has ended without performing supply of power from the secondary battery 200. The first reason is that a part of energy which was discarded in the related art is effectively used in the form of an increase in the FC voltage. The second reason is that the fact that the required output has a negative value for a short time from a time point at which the accelerator pedal is depressed when the accelerator pedal is depressed during execution of the auxiliary machine power consumption and there is a temporal margin until the required output calculated based on the amount of depression is actually required is used.

In this embodiment, since a lithium-ion secondary battery is employed, the maximum output of the secondary battery 200 is limited to a low value in order to curb deterioration of the secondary battery 200. Accordingly, the advantage that a state in which the power generated by the fuel cell 100 is less than the required output can be avoided greatly contributes to drivability.

In this embodiment, the frequency in which the second state is set is minimized by combining the prediction of the required output in S710 and the determination of the voltage in S730. Accordingly, it is possible to prevent the FC voltage from reaching the high-potential avoidance voltage Vmas or to prevent drying of the fuel cell 100 from progressing.

A second embodiment will be described below. In the second embodiment, differences from the first embodiment will be mainly described. Points which will not be particularly described are the same as in the first embodiment.

Figure 8:
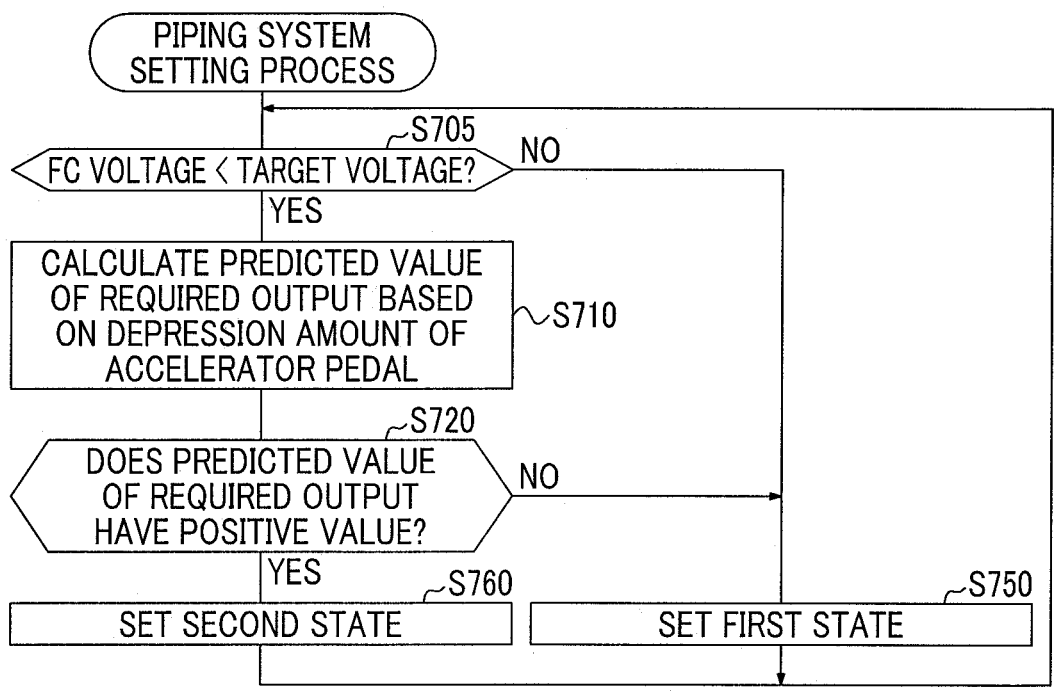
FIG. 8 is a flowchart illustrating a piping system setting process according to a second embodiment.

FIG. 8 is a flowchart illustrating a piping system setting process according to the second embodiment. First, the control unit 300 determines whether the FC voltage is lower than a target voltage Vtgt2 (S705). The target voltage Vtgt2 is a fixed value. The target voltage Vtgt2 is determined in advance as a value less than the high-potential avoidance voltage Vmax as illustrated in FIG. 5.

When the FC voltage is equal to or higher than the target voltage Vtgt2 (NO in S705), the control unit 300 sets the first state (S750).

On the other hand, when the FC voltage is lower than the target voltage Vtgt2 (YES in S705), the control unit 300 performs S710 and S720 as described in the first embodiment. When the determination result of S720 is NO, the control unit 300 sets the first state. When the determination result of S720 is YES, the control unit 300 sets the second state.

According to this embodiment which has been described above, calculation for changing the target voltage does not have to be performed.

A third embodiment will be described below. In the third embodiment, differences from the first embodiment will be mainly described. Points which will not be particularly described are the same as in the first embodiment.

Figure 9:
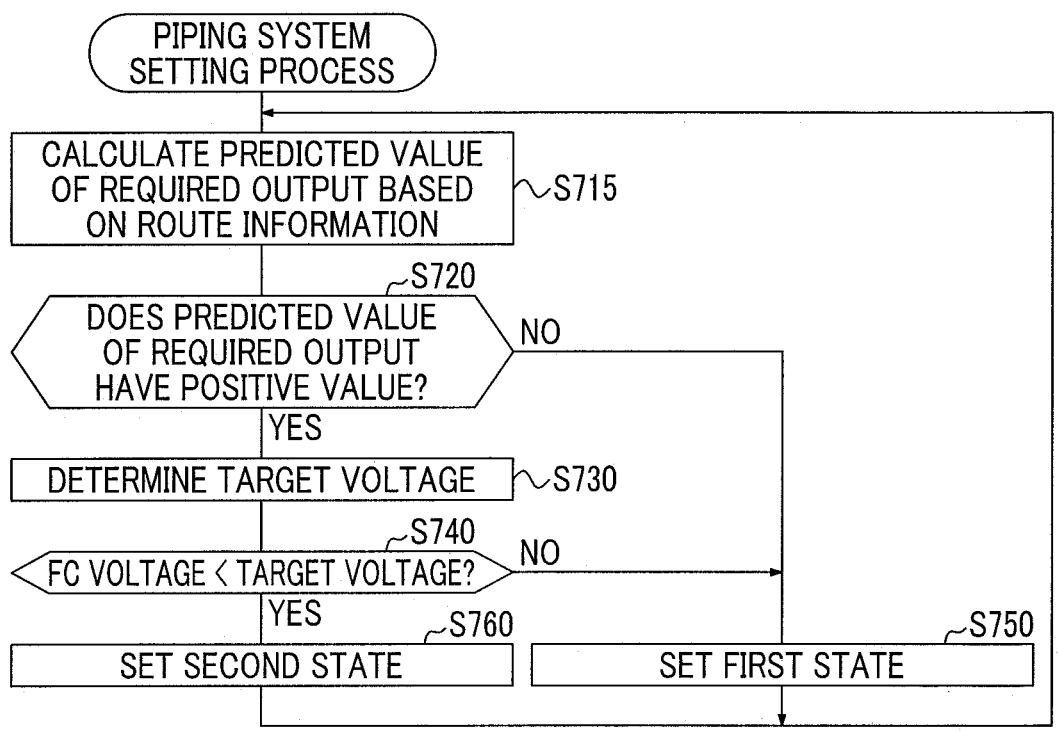
FIG. 9 is a flowchart illustrating a piping system setting process according to a third embodiment.

FIG. 9 is a flowchart illustrating a piping system setting process according to the third embodiment. The third embodiment is the same as the first embodiment, except that S715 is performed instead of S710 in the first embodiment.

In S715, the control unit 300 calculates a predicted value of the required output based on route information. The control unit 300 acquires route information from the route information output device 390. The route information output device 390 acquires a current location using a GNSS and outputs route information on a scheduled traveling route.

The route information includes information which can affect the required output. Information which can affect the required output is, for example, a road gradient or a radius of curvature of a curved road. The control unit 300 calculates the required output by combining such information. In the third embodiment, an amount of depression is not considered for calculating the required output. In another embodiment, the amount of depression may be considered for calculating the required output.

For example, when the vehicle travels on a road which changes rapidly from a downhill gradient to an uphill gradient, the control unit 300 predicts that the required output changes from a negative value to a positive value before the gradient changes from the downhill gradient to the uphill gradient.

Alternatively, for example, when an expressway is curved and then extends straightly, it is predicted that the required output is switched from a negative value to a positive value before the curve ends. According to this embodiment, it is possible to more appropriately perform prediction.

The disclosure is not limited to the above-mentioned embodiments and can be embodied in various configurations without departing from the gist thereof. For example, technical features in the embodiments corresponding to technical features in the aspects described in the SUMMARY can be appropriately subjected to replacement or combination in order to solve some or all of the above-mentioned problems or to achieve some or all of the above-mentioned advantageous effects. The technical features can be appropriately deleted unless they are described to be essential in this specification. For example, the following embodiments are exemplified.

The first degree of opening of the bypass valve 560 may not be the maximum degree of opening, and may be, for example, a degree of opening which is slightly less than the maximum degree of opening.

The second degree of opening of the bypass valve 560 may not be the minimum degree of opening, that is, the degree of opening in the valve closed state, and may be, for example, a degree of opening which can pass a slight amount of air.

When the bypass valve 560 is set to the first degree of opening, one of the inlet shunt valve 520 and the pressure control valve 530 may be set to a state in which air can pass therethrough. Here, a degree of opening of at least one of the inlet shunt valve 520 and the pressure control valve 530 may be set to be less and thus the FC air flow rate may be set to a small value.

The type of the secondary battery 200 is not limited to a lithium-ion secondary battery, but may be a nickel-hydride secondary battery or an all solid battery, and is not particularly limited.

After a time point at which the required output becomes a positive value (time t4 in the embodiment), supply of power from the secondary battery 200 may be performed. Even when a secondary battery which has been improved such that the output does not have to be limited in an actual usage range is employed, the advantage that the SOC can be maintained is more improved as the supply of power from the secondary battery 200 is more curbed and thus the supply of power from the secondary battery 200 may be curbed as much as possible.

The method of determining whether charging of the secondary battery 200 is limited may be changed. For example, the value of the output Q440 may be determined using only the SOC determination flag Fs.

When auxiliary machine power consumption is performed, a part of the regenerative power may be supplied to the air compressor 170 and the coolant pump 250 and the other regenerative power may be effectively used. The effective use includes, for example, supply to the air-conditioning compressor 245 and charging of the secondary battery 200.

When auxiliary machine power consumption is performed, all the regenerative power may be supplied to the air compressor 170. In this case, the coolant pump 250 does not have to be driven.

The motor generator may be configured to realize the motor function and the generator function by separate bodies.

The vehicle may be a connected car. A connected car is a vehicle that has a communication device mounted therein and can be serviced by communication with a cloud. In the case of a connected car, route information may be acquired from the outside by communication. The vehicle may be an automatically driven vehicle that automatically controls a vehicle speed.

The fuel cell system 10 may be mounted in a transportation machine other than a vehicle. For example, the fuel cell system may be mounted in a subway or a ship.

The fuel cell system 10 may be used as a power source of a machine other than a transportation machine. The fuel cell system may be used as a power source of construction equipment or an elevator in which a regenerative brake is mounted.

In the above-mentioned embodiments, some or all of the functions and the processes which are embodied in software may be embodied in hardware. Some or all of the functions and the processes which are embodied in hardware may be embodied in software. For example, various circuits such as an integrated circuit, a discrete circuit, or a circuit module in which such circuits are combined may be used as hardware.

What is claimed is:

1. A fuel cell system comprising:
   a fuel cell;
   a secondary battery;
   a motor generator configured to charge the secondary battery with a regenerative power, the motor generator being driven with electric power from at least one of the fuel cell and the secondary battery;
   an air compressor configured to generate compressed air, the air compressor being driven with electric power from at least one of the fuel cell and the regenerative power;
   a supply passage configured to supply the compressed air to the fuel cell;
   a discharge passage configured to discharge the compressed air from the fuel cell;
   a bypass passage configured to connect the supply passage and the discharge passage;
   a bypass valve disposed in the bypass passage; and
   a control unit configured to perform auxiliary machine power consumption of supplying at least a part of the regenerative power to the air compressor upon satisfaction of a necessary condition that charging of the secondary battery is limited when the fuel cell does not generate electric power and the regenerative power is generated,
   wherein the control unit is configured to perform prediction of whether a required output for the motor generator has a positive value and determination of whether a voltage of the fuel cell is less than a target voltage during execution of the auxiliary machine power consumption, wherein the control unit is configured to set the bypass valve to a first degree of opening during execution of the auxiliary machine power consumption when a result of at least one of the prediction and the determination is negative, and wherein the control unit is configured to set the bypass valve to a second degree of opening less than the first degree of opening during execution of the auxiliary machine power consumption when results of both the prediction and the determination are positive.

2. The fuel cell system according to claim 1, wherein the control unit is configured to use an amount of operation which is input to a user interface for manipulating the required output for the motor generator for the prediction.

3. The fuel cell system according to claim 1, wherein the target voltage has a fixed value.

4. The fuel cell system according to claim 1, wherein the control unit is configured to determine a predicted value of the required output when it is predicted that the required output has a positive value, wherein the control unit is configured to set the target voltage to a first voltage value when the predicted value is a first positive value, and wherein the control unit is configured to set the target voltage to a second voltage value higher than the first voltage value when the predicted value is a second positive value greater than the first positive value.

5. The fuel cell system according to claim 4, wherein the fuel cell system is mounted in a transportation machine, and wherein the control unit is configured to use route information for the prediction.

6. The fuel cell system according to claim 1, wherein the first degree of opening is a maximum degree of opening.

7. The fuel cell system according to claim 1, wherein the second degree of opening is a degree of opening in a valve closed state.

8. The fuel cell system according to claim 1, further comprising:

an inlet valve that is disposed in the supply passage and is located between a junction of the supply passage with the bypass passage and the fuel cell; and an outlet valve that is disposed in the discharge passage and is located between a junction of the discharge passage with the bypass passage and the fuel cell, wherein the control unit is configured to set at least one of the inlet valve and the outlet valve to a valve closed state when the bypass valve is set to the first degree of opening during execution of the auxiliary machine power consumption.

9. The fuel cell system according to claim 1, further comprising an outlet valve that is disposed in the discharge passage and is located between a junction of the discharge passage with the bypass passage and the fuel cell, wherein the control unit is configured to set the outlet valve to a valve closed state when the bypass valve is set to the first degree of opening during execution of the auxiliary machine power consumption, and wherein the control unit is configured to set the outlet valve to a valve open state when the bypass valve is set to the second degree of opening during execution of the auxiliary machine power consumption.

* * * * *